US006027593A

United States Patent [19]

Lunt et al.

[11] Patent Number: 6,027,593

[45] Date of Patent: Feb. 22, 2000

[54] PROCESS FOR THE FABRICATION OF DISPOSABLE DIAPERS AND OTHER DISPOSABLE PRODUCTS AND A DISPOSABLE DIAPER

[76] Inventors: Audrey Lunt, 5755 Big Tree Rd., Orchard Park, N.Y. 14127; Gregory F. Ward, 11115 Rotherick Dr., Alpharetta, Ga. 30202

[21] Appl. No.: 08/829,984

[22] Filed: Apr. 1, 1997

[51] Int. Cl.[7] ...................................................... B32B 31/00

[52] U.S. Cl. .......................... 156/178; 156/290; 604/366; 604/370

[58] Field of Search .................................... 156/73.1, 166, 156/176, 178, 179, 180, 181, 290, 308.2, 308.4, 324; 604/365, 366, 367, 370

[56] References Cited

U.S. PATENT DOCUMENTS

| | | | |
|---|---|---|---|
| 4,103,062 | 7/1978 | Aberson et al. | 428/283 |
| 5,370,764 | 12/1994 | Alikhan | 156/553 |
| 5,507,895 | 4/1996 | Suekane | 156/73.1 |
| 5,562,790 | 10/1996 | Ehlert et al. | 156/73.1 |
| 5,562,793 | 10/1996 | Menard | 156/263 |
| 5,580,418 | 12/1996 | Alikhan | 156/553 |
| 5,599,420 | 2/1997 | Yeo et al. | 156/290 |
| 5,667,619 | 9/1997 | Alikhan | 156/253 |
| 5,667,625 | 9/1997 | Alikhan | 156/553 |

*Primary Examiner*—James Sells

[57] ABSTRACT

The present invention relates to a rapid and low cost procedure for joining webs and films containing dissimilar polymers. It is especially applicable but not limited to the construction and assembly of disposable products such as infant and adult incontinent products, feminine hygiene products, and other low-cost, high volume disposable products. The process involves producing a high rate of heat flux through the dissimilar materials where the material with the higher plastic point is at the influx point and the lower plastic point material is adjacent and further from the heat source. In addition to this constraint and as a necessary component the application of the high rate of heat flux must be accompanied by a pressure of appropriate to the difference in plastic points and to the relative thickness of the dissimilar materials to be joined.

4 Claims, 4 Drawing Sheets

1 5 6 2 3 4

PROCESS FOR THE FABRICATION OF DISPOSABLE DIAPERS AND OTHER DISPOSABLE PRODUCTS AND A DISPOSABLE DIAPER

BACKGROUND OF THE INVENTION

1. Field of the Invention

This invention relates generally to a process to assemble disposable personal hygiene products and to the products so assembled, and more particularly to infant and adult disposable diapers and other incontinent devices, such as sanitary napkins and pads, designed to absorb and retain urine or other bodily fluids excreted by the wearer of the product.

2. Status and Description of the Prior Art

The manufacture of disposable hygienic products such as diapers involves the assembly of several components into the final product. Typically, a diaper is assembled from roll goods made from thermoplastic polymers which surround an absorbent layer or component. A standard construction uses a liquid impervious back-sheet made of polyethylene film and a liquid permeable nonwoven cover stock made from polypropylene spunbond or thermally bonded carded fibers. An absorbent pad or system, usually made of fiberized wood pulp combined with superabsorbent materials, is sandwiched between the back-sheet and the coverstock. Other components such as elastomeric threads or bands are also added at the crotch/leg area or the waist band for improving fit and reducing leakage. A secondary leg barrier or cuff may be added to improve the retention of liquid and semi-liquid wastes. The standard method for assembling this system is through the use of hot melt adhesives which are applied by sprays or other hot-melt application methods.

The primary negative aspect of the use of hot melts is the cost of the raw materials. In many applications with complex assembly requirements the cost of hot melt adhesive can become a significant percentage of the cost of the finished product.

An ideal process to join diaper components is to use heat sealing. The process of heat sealing includes both thermal and ultrasonic welding means. It is well known from the physical chemistry of high polymers and from the literature of ultrasonic welding machines that the heat sealing, thermal bonding, joining, or welding of like polymers is a viable practice. It is possible to thermally bond two polyethylene films, a polyethylene film and a polyethylene nonwoven or two polyethylene nonwovens. The same is true of two polypropylene films, a polypropylene film and a polypropylene nonwoven or two polypropylene nonwovens. This viability of heat sealing exists between all homologous polymers. Further the process is not limited to the joining of webs or films but may also be utilized to join elastic members such as are used in the leg areas or waist area of diapers. In fact the process of the instant invention may be used to join any components composed of dissimilar polymers that are present in the product to be assembled.

The process of thermal bonding is well known and is used in many applications in disposables production. A familiar example is the joining or seaming of polyethylene bags. Thermal bonding or thermal welding is accomplished by applying a heated wheel or bar to the materials to be joined. Ultra sonic welding is also available to join similar plastics.

The shortcoming of all of the thermal bonding or welding methods is that these processes are only applicable to the bonding of identical or homologous materials. It is easy to join a polyethylene film to another polyethylene film as in bag manufacturing.

Problems are encountered when dissimilar polymers are used. This problem is related to the lack of solubility between two different high polymers when in the melt state. The dissimilar polymers will not mix and will try to maintain separate domains. This is evident in polymer alloys such as PVC/ABS where the product of mixing two polymers is an alloy rather than a solution. In this case the boundaries between the polymers are very distinct.

Technical literature from Branson (*Characteristics And Compatibility Of Thermoplastics For Ultrasonic Assembly*) © Branson Ultrasonics Corporation, 1971 Rev. 4/93 printed USA 6/94) shows that, from their broad industrial experience, technical background and judgment, dissimilar polymers cannot be joined by ultra-sonic (thermal) means.

The instant patent is differentiated from the teachings of U.S. Pat. No. 5,507,895 issued to Suekane which teaches that, for a diaper, two dissimilar polymers may be joined by ultrasonic means. This invention teaches that products utilizing components with dissimilar plastic points may be welded together when the web or film with a higher plastic point is placed next to the heating means to prevent sticking of the web or film to the heating means which may be ultrasonic or thermal. It also limits the invention to the use of an intermittent weld line.

SUMMARY OF INVENTION

In view of the foregoing, the main object of the invention is to provide a process wherein a product containing layers of webs or films, the major component of each said web or film is polymerically dissimilar from the adjacent layer, may be strongly and continuously joined together through a heat bonding means.

This objective has been achieved by a unique combination of process conditions and factors. The invention demonstrates that dissimilar members, ribbons, webs and films may be continuously joined by the application of a heat flux which enters the combination of dissimilar polymers layers through the layer with the higher plastic point and that this heat flux be simultaneously accompanied by a pressure that is related to the differences in the plastic points of the dissimilar polymers and that the heat flux be related to the difference between the plastic points of the dissimilar polymers. It is important to note that the melting point and plastic point can be quite different depending on the thermoplastic used.

BRIEF DESCRIPTION OF DRAWINGS

For a better understanding of the invention, as well as other objects and features thereof, reference is made to the accompanying drawings wherein.

DETAILED DESCRIPTION

Figure 2:
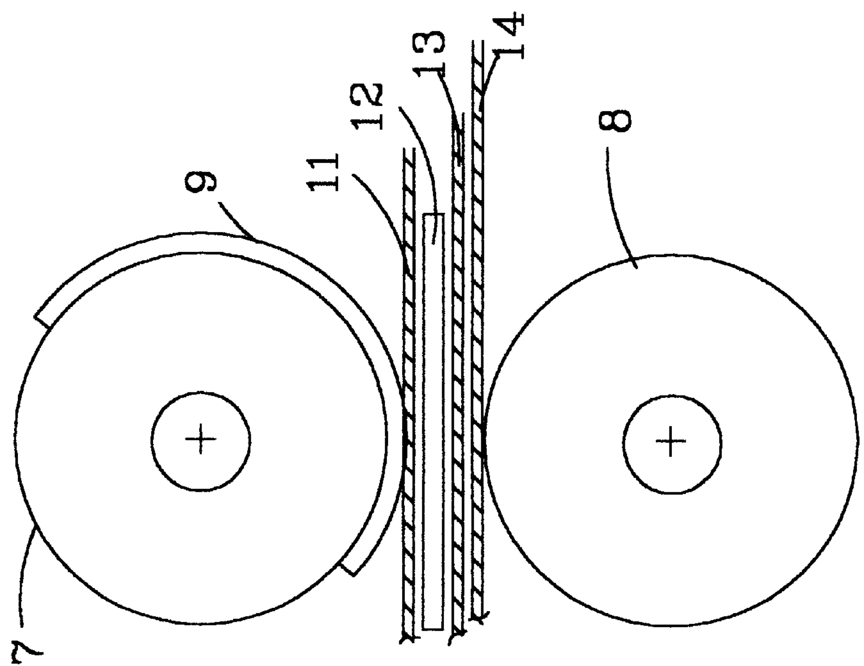
FIG. 2 shows a heated rotary die

While the present invention is amenable to many embodiments in various forms, there is shown in the drawings and will hereinafter be described presently preferred embodiments of the invention with the understanding that the present disclosure is to be considered as an exemplification of the invention and is not intended to limit the invention to the specific embodiments illustrated.

Figure 1:
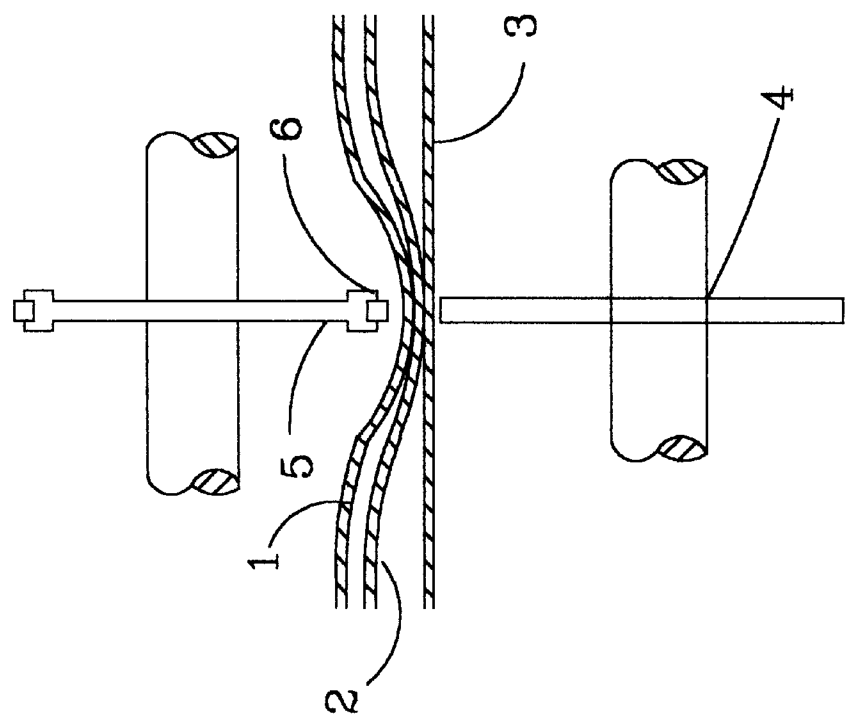
FIG. 1 shows a simple heated rotary seamer
Figure 3:
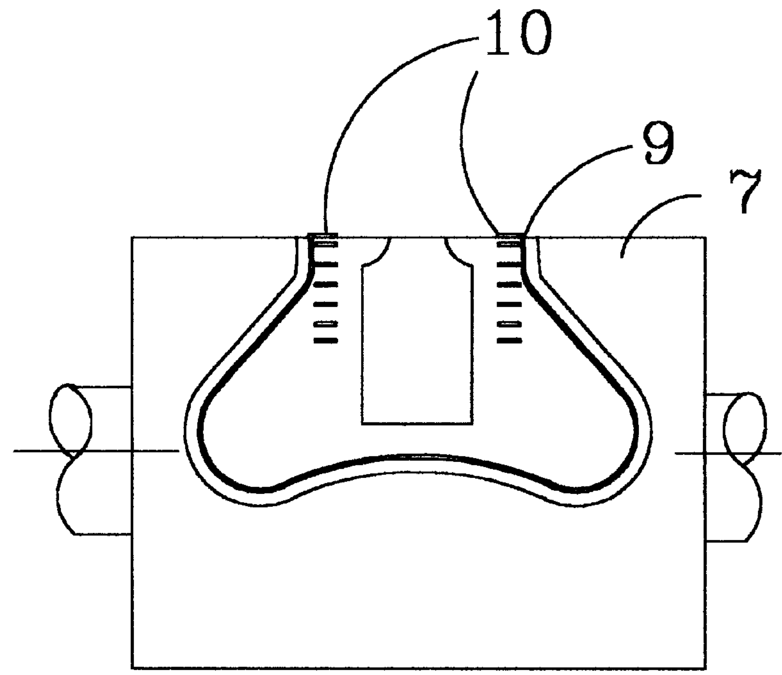
FIG. 3 shows a view of the rotary die details

Referring now to the drawings, therein is illustrated in FIG. 1 a simple rotary seamer which employs a heated rotary disk 6 that rides against a rotating disk 4. Disk 4 may be heated or unheated depending on the application and the materials to be assembled by heat welding. Disk 6 is supported by shaft 5 which uses a pressure means such as a hydraulic cylinder to apply a controlled pressure to the nip created by disk 6 and disk 4. The temperature of disk 6 is controlled by thermostatic means to the correct temperature required for the instant application. The disk 6 may be driven externally or may be rotated by pulling the materials through the nip.

The material 1 adjacent to disk 6 has the highest plastic point whereas the plastic point of material 2 is lower than material 1. Material 3 may have the lowest plastic point of the three materials shown in the figure. In this case disk 4 may not be heated. In the event material 3 has a plastic point higher than material 2 the disk 4 will require heating.

Figure 6:
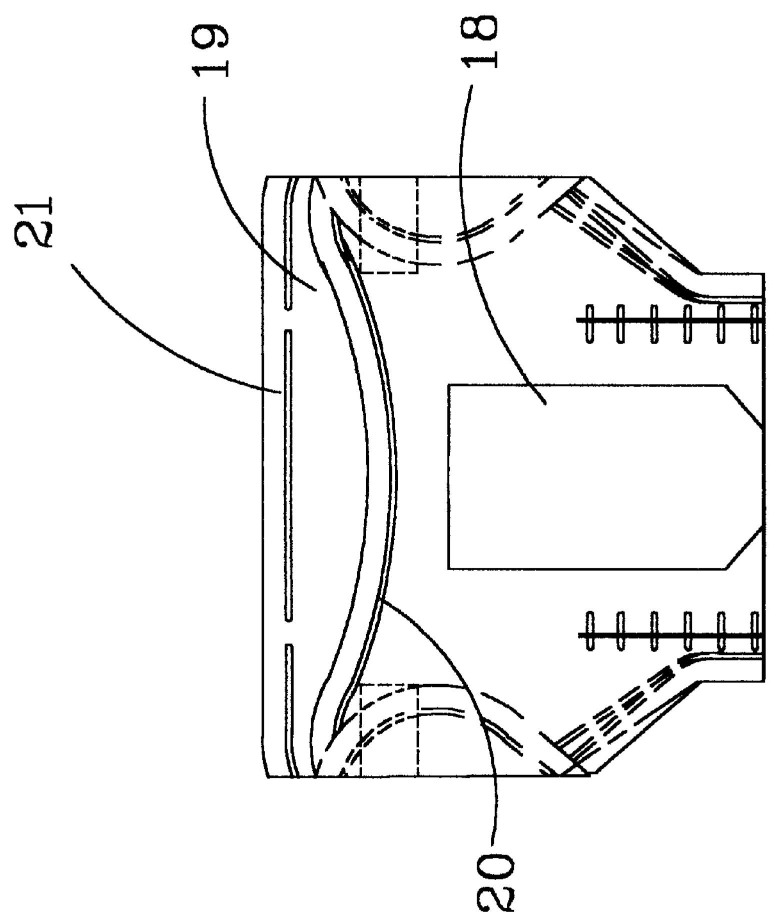
FIG. 6 shows an unfolded diaper.

Referring again to the drawings, FIG. 2 illustrates a rotary die system used to assemble the diaper of FIG. 6. The driven rotary cylinder 7 is heated and contains both a continuous raised surface 9 and discontinuous raised surfaces 10. Rotary cylinder 8 may or may not be heated or have surfaces congruent to cylinder 7 depending on the materials and application. Driven rotary cylinder 7 uses a pressure means such as hydraulic cylinders to apply a controllable pressure to the nip created by cylinders 7 and 8.

In the instant application cylinder 8 is smooth and is unheated. Both cylinders are driven. Material 11 is the cover-sheet or facing of the diaper and may, as is well known to those familiar with the art, may be any of several different types of material. In the instant example material 11 is composed of spunbond polypropylene but may be any of a variety of nonwovens. Material 12 is the absorbent pad which is composed of fiberized wood-pulp and super absorbent polymer. This pad is not bonded by the rotary die system but is restrained from moving laterally by the discontinuous bonds which are also used to attach the elastic members 13 to the cover sheet and the water proof barrier material 14. For purposes of the present discussion the elastic members may include elastic materials, pre-stretched monofilament strands or threads, polyurethane foams or films, shrink films and other materials and structures which can be used to exert a gathering force on the associated diaper components.

The barrier layer may be composed of any number of materials well known to those familiar with the art such as polyethylene film both breathable and non breathable, polypropylene film, spunbond-meltblown-spunbond (SMS) nonwoven, meltblown nonwoven or other water impervious films or nonwovens.

In all cases the material with the higher plastic point is located adjacent to the heated cylinder. The plastic point was defined for our experiments as the temperature at which a sample nonwoven web will elongate more than 40% in 5 seconds when subjected to a stress equal to 10% of its normal tensile strength at break. The material 11 adjacent to cylinder 7 has the highest plastic point whereas the plastic point of material 14 is lower than material 21. Material 3 may have the lowest plastic point of the three materials shown in the figure. In this case disk 4 may not be heated. In the event material 3 has a plastic point higher than material 2 the disk 4 will require heating. Pressure applied at the nip formed by the die or rotating discs is dependent on the individual and cumulative thickness of the materials.

Referring again to the drawings, therein is illustrated in FIG. 6 a diaper 19 designed for use by premature infants of 3 pounds or less which was assembled using the principles of the present invention. While the instant example is a diaper intended for premature infants it is apparent to those familiar with the art that the process can be used effectively with infant and toddler diapers, training pants, adult diapers and other disposable products containing thermoplastic webs, films and nonwovens. The continuous die surface 9 provides the continuous seal 21 around the outer perimeter of the diaper, The discontinuous surfaces 10 are used to seal the elastic member to the diaper back-sheet and cover sheet and may also be used to restrict the axial and lateral movement of the absorbent pad

ALTERNATIVE EMBODIMENTS

Figure 4:
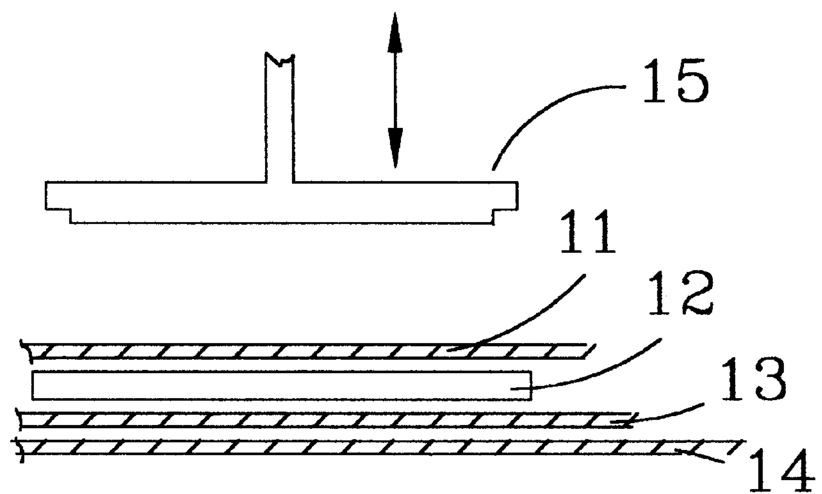
FIG. 4 shows a reciprocating die platen
Figure 5:
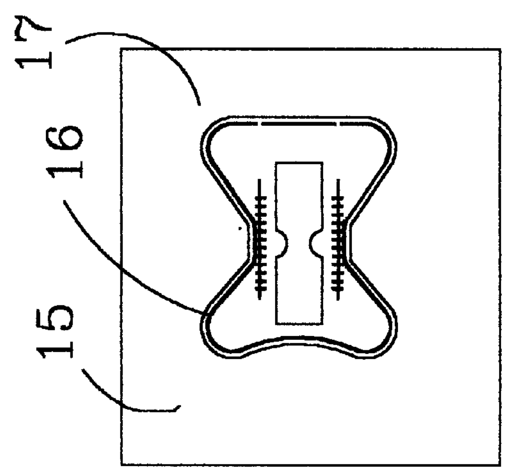
FIG. 5 shows a view of the platen die details
Figure 7:
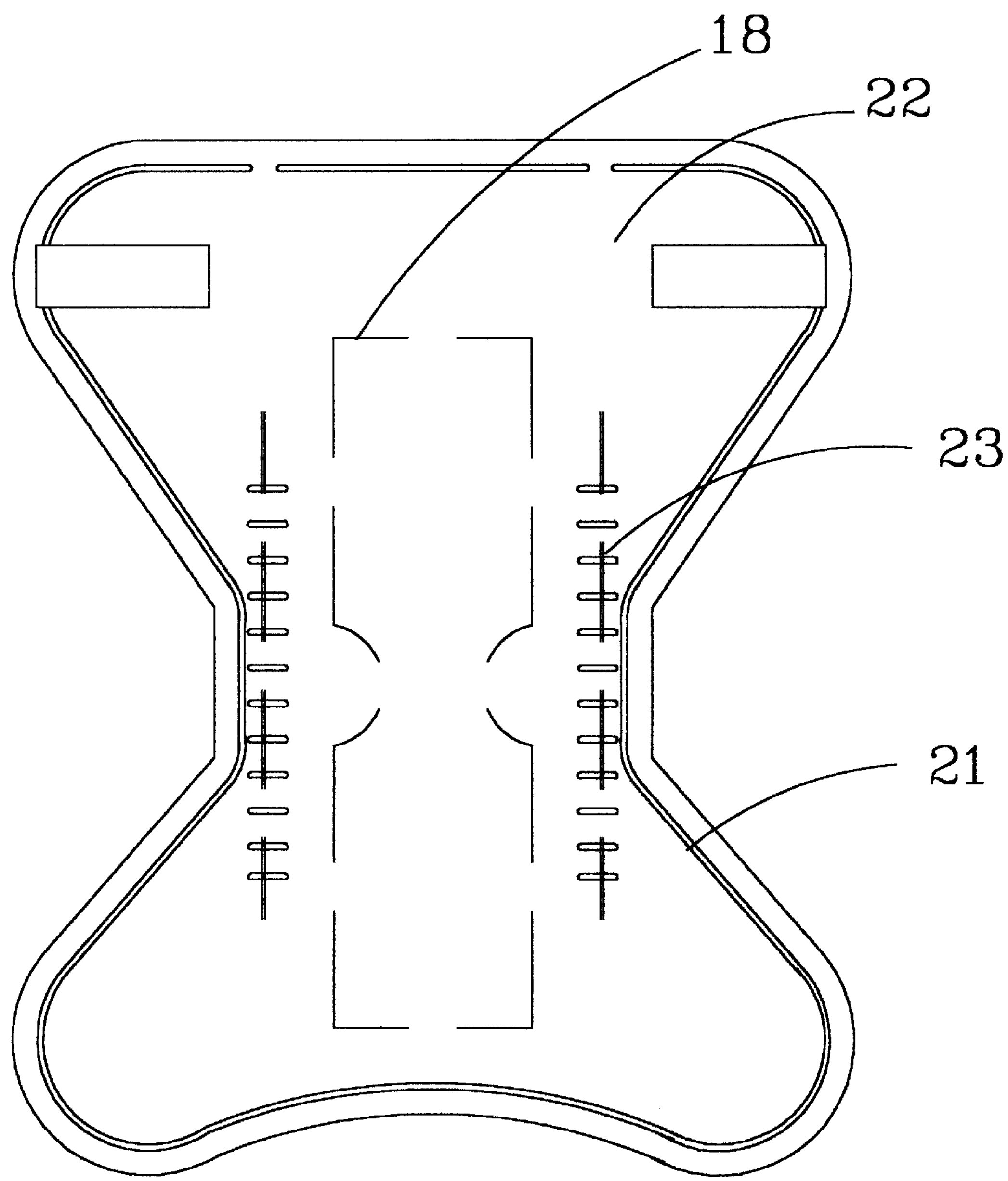
FIG. 7 shows the back side of a folded diaper.

FIG. 4 shows a stationary platen 14 which holds the combination of materials to be bonded 11, 12, 13. FIG. 5 shows a reciprocating heated platen 15 containing the die outline 16 and the grids 17 for attaching the elastic elements. The reciprocating heated platen 15 is driven by a hydraulic or other mechanical system which is adjustable to give the proper pressure for bonding.

Although the above descriptions contain specific applications, these should not be construed as limiting the scope of the invention but as merely providing illustrations of some of the embodiments of this invention

We claim:

1. A method using a thermal bonding means for continuously thermally bonding:

A. a thermoplastic polymeric film to two or more thermoplastic polymeric nonwovens where said film and said nonwovens are made from dissimilar polymers; or B. a thermoplastic polymeric film to two or more thermoplastic polymeric films where said films are made from different polymers; or C. a thermoplastic polymeric nonwoven to two or more thermoplastic polymeric nonwovens where said nonwovens are made from different polymers, or D. an elastic film, thread or ribbon or other elastic member to a thermoplastic polymeric film and a thermoplastic nonwoven:

wherein the bonding is induced by subjecting the three or more nonwovens, films or combinations of nonwovens, elastic member and films to a thermal bonding means capable of providing a nip pressure of at least 10 pounds per linear inch and a temperature of at least 20° F. above the plastic point of the higher plastic point polymer, and wherein the heated member of the thermal bonding means is adjacent to said nonwoven or film with the higher plastic point and said nonwovens, films and elastic members with progressively lower plastic points are progressively further from said heating means with the lowest plastic point material adjacent to the unheated member.

2. The method of claim 1 where said pressure is applied with a heated rotary disc or die to an opposing unheated rotary member.

3. The method of claim 1 where said bonding is done on a piece basis using a heated upper platen with a reciprocating means and an unheated lower platen.

4. A disposable diaper comprised of a water impermeable back sheet, an absorbent core, two elastic members, and a liquid permeable top sheet wherein said back sheet, said elastic members and said top sheet are joined using the thermal bonding method of claim 1.

* * * * *